(12) United States Patent
Gong

(10) Patent No.: US 8,760,009 B2
(45) Date of Patent: Jun. 24, 2014

(54) WIRELESS POWER SOURCE

(76) Inventor: Samuel Gong, Harbor City, CA (US)

(*) Notice: Subject to any disclaimer, the term of this patent is extended or adjusted under 35 U.S.C. 154(b) by 492 days.

(21) Appl. No.: 13/115,853

(22) Filed: May 25, 2011

(65) Prior Publication Data

US 2012/0299388 A1  Nov. 29, 2012

(51) Int. Cl.
H01F 27/42 (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

| 6,023,420 | A | 2/2000 | McCormick et al. |
| 6,127,799 | A | 10/2000 | Krishnan |
| 6,906,495 | B2 | 6/2005 | Cheng et al. |
| 6,972,543 | B1 | 12/2005 | Wells |
| 6,995,729 | B2 | 2/2006 | Govari et al. |
| 7,211,986 | B1 | 5/2007 | Flowerdew |
| 7,511,454 | B1 | 3/2009 | Legg |
| 7,521,890 | B2 | 4/2009 | Lee et al. |
| 7,576,514 | B2 | 8/2009 | Hui |
| 7,715,187 | B2 | 5/2010 | Hotelling et al. |
| 7,804,272 | B2 | 9/2010 | Morita et al. |
| 7,826,873 | B2 | 11/2010 | Telefus |
| 2005/0156563 | A1 | 7/2005 | Lin et al. |
| 2010/0084918 | A1 | 4/2010 | Fells et al. |
| 2010/0184371 | A1 | 7/2010 | Cook et al. |
| 2011/0018356 | A1* | 1/2011 | Chatterjee ..................... 307/104 |
| 2013/0307349 | A1* | 11/2013 | Hall et al. ..................... 307/104 |

OTHER PUBLICATIONS

Anne Eisengerg, Novelties, Automatic Recharging From a Distance, The New York Times Sunday, Mar. 11, 2012.

* cited by examiner

Primary Examiner — Robert L. Deberadinis
(74) Attorney, Agent, or Firm — David A. Belasco; Belasco Jacobs & Townsley, LLP

(57) ABSTRACT

A wireless power transmission system includes a transmitting portion and a receiving portion. The transmitting portion includes an inductive coil as a transmitting antenna. The inductive coil will have 20-40 turns. A control circuit includes a field-effect transistor, a signal generator, and a capacitor with a resistor in parallel connection with the capacitor. The capacitor is typically a 1.5 microFarad Mylar® film capacitor. The resistor will be 2-4 ohms. The field-effect transistor may be a Metal Oxide Semiconductor Field Effect Transistor (MOSFET). The receiving unit has at least one loop stick antenna located at a distance from a center of the coil of up to twice a diameter of the coil. The circuit is tunable between 6 kHz and 10 kHz. 8 kHz has been found to be optimal. The inductive transmitting coil is closely coupled. The loop stick antennae of the receiving portion may have an iron core or a ferrite core.

11 Claims, 7 Drawing Sheets

Data

| Distance from center of coil (in) | Current Received (pointing vertically) | Current Received (pointing horizontally) |
|---|---|---|
| 0 in. | 1.2 A | 1.0 A |
| 1 in. | 1.1 A | .9 A |
| 5 in. | .9 A | .7 A |
| 10 in. | .4 A | .2 A |
| 15 in. | .1 A | .05 A |

Data

| Distance from center of coil (in) | Current Received (pointing vertically) | Current Received (pointing horizontally) |
|---|---|---|
| 0 in. | 1.0 A | 0.9 A |
| 1 in. | 0.8 A | 0.7 A |
| 5 in. | 0.5 A | 0.5 A |
| 10 in. | 0.1 A | 0.1 A |
| 15 in. | 0.0 A | 0.0 A |

WIRELESS POWER SOURCE

FIELD OF INVENTION

This invention relates to the field of power transmission and more specifically to apparatus and methods for efficiently transmitting power over a distance without use of wires or cables.

BACKGROUND OF THE INVENTION

It has long been known that it is possible to induce a current in a circuit without a physical connection to that circuit using the principle of magnetic resonance. Resonance is the tendency of a system to oscillate with larger amplitude at some frequencies than others. These frequencies are known as the system's resonant frequencies. At these frequencies, even small periodic driving forces can produce large amplitude oscillations, because the system stores energy. It has been shown that it is possible to tune the components of a circuit to maximize resonance with another circuit. The following references describe attempts to make use of circuit resonance for power transmission and related tasks.

U.S. Pat. No. 7,826,873, issued to Telefus, discloses a contactless energy transmission converter. This system wirelessly transfers energy from a source unit to a target unit. The source unit converts a current into a wireless signal. Preferably the source unit is coupled to a power source. The target unit is comprised of induction coils which generate electromagnetic fields, to pick up the signal and convert the signal into a current.

This system includes a transmitter configured to use a current to produce a wireless energy signal, and a receiver configured to convert the wireless energy signal into a current and charge a battery. A power source is coupled to a multiphase transmitter. The multiphase transmitter is coupled to a transistor pair. The transistor pair is coupled to the controller. A current emitted from the transistor pair is further coupled to a capacitor which in turn is coupled to a transmission antenna.

The contactless energy transmission converter operates when the power source supplies current to a multiphase transmitter which produces a first signal having a first frequency. The first signal is coupled to the transistor pair. The controller controls when the transistor pair is turned "on" and turned "off". When the transistor pair is "on", the first signal is allowed through the transistor pair and when the transistor pair is turned "off" the signal does not go through. As such, the controller is able to produce a square wave packet having a low frequency wherein the square wave packet frames the first signal having a first frequency, thus modulating the first signal. This modulated signal is then transmitted by the transmission antenna. The transmission antenna transmits the signal to the reception antenna of the receiver. The reception antenna is coupled to a DC-Converter which converts the signal into a DC current. The DC current is then used to charge the battery.

U.S. Pat. No. 7,521,890, issued to Lee et al. is directed to a system and method for selective transfer of radio frequency power. This process of wireless power transfer occurs between a primary unit and a secondary unit. The primary unit converts the DC power supplied by a conventional DC power supply connected to an AC outlet to a multitude of radio frequency oscillations. The various RF oscillations can be of different RF frequencies, or they could all have the same frequency. The RF signals are used to drive a set of primary coil arrays which are in general two dimensional in nature to generate inductive magnetic field above a substantially laminar surface in which the primary coils are embedded. When a device with a device adapter equipped with one or more secondary coils which can resonate with the inductive magnetic field excited by the primary coils, the RF power is transferred from the primary unit to the secondary unit by a RF cable. The transferred RF power is subsequently conditioned and rectified by the rectification circuit within the secondary unit into a regulated DC power with a substantially constant voltage. The regulated DC power is then used to power the device to perform such tasks as charging a secondary battery, or to be used directly by the device to power its electronics, etc.

The primary unit comprises a two-dimensional array of primary coils and attendant matching capacitors as well as the power rails for connecting the primary coils and capacitors to the primary RF power supply.

A compatible secondary unit sits on top of the primary surface, the parallel LC resonance frequency is shifted away from the driving frequency of the RF source, which, in turns, causes the effective local LC impedance to decrease sufficiently to enable the load current to flow into the local LC network. The receiving coil in the secondary unit likewise has a compensating capacitor in parallel with the receiving induction coil. The act of bringing the secondary unit close to one or more of the local LC networks of the primary unit, the inductive coupling is established between the primary unit and the secondary unit. This mutual inductive coupling creates a new local resonance substructure with its own resonance and anti-resonance frequencies.

Each capacitor is in series with a MOSFET switch which can be turned on to enable the capacitor it is directly connected to, or to turn off to disable the capacitor. Since each MOSFET switch can be either ON, or OFF, the switched capacitor bank can provide different capacitance values which are more or less linearly distributed with values from 0 pF to 1,500 pF. The capacitance values are not precise because of the inherent variation of stock capacitors as well as the source drain capacitances of the MOSFETs. The source drain capacitance of the MOSFET is unimportant when the MOSFET is ON. However, when MOSFET is OFF, the capacitor it is connected to is not completely disabled because of the source drain capacitance which is in series with the external capacitor. The source drain capacitance of the MOSFET is not a constant, either, but depends on the source drain voltage. Hence it would be difficult to modify the capacitance values of the external capacitors to compensate for the added OFF capacitances caused by MOSFETs.

U.S. Pat. No. 7,511,454, issued to Legg illustrates a battery label with wireless battery charging circuit. This system includes an inductor that may comprise a small number of circular turns of sufficient diameter to allow them to cover an area of approximately 18 to 20 square inches (i.e. a coil of a diameter for example between 4 and 5 inches). This design manifests itself as a suitably flat coil, and could easily be molded into a mat or into the base of a tray made of insulating material. Devices containing wireless rechargeable batteries to be charged could be placed onto the mat or into the base of a tray allowing energy would flow from the charging circuit to the wireless battery charged circuit by electromagnetic induction.

U.S. patent application No. 2010/0184371, published for Cook et al. disclose to transmitters for wireless power transmission. This system includes a transmitter for generating a magnetic field for providing energy transfer from an input power. A receiver couples to the magnetic field and generates an output power for storing or consumption by a device (not shown) coupled to the output power. Both the transmitter and the receiver are separated by a distance. The transmitter and receiver may be configured according to a mutual resonant relationship and when the resonant frequency of the receiver and the resonant frequency of the transmitter are matched, transmission losses between the transmitter and the receiver 108 are minimal when the receiver 108 is located in the "near-field" of the magnetic field 106.

U.S. Pat. No. 6,906,495, issued to Cheng et al. is directed to contact-less power transfer. This reference discusses a prior art inductive system that includes a multiple coil array. The primary magnetic unit consists of an array of coils. The secondary magnetic unit may consist of a coil. When the secondary magnetic unit is in proximity to some coils in the primary magnetic unit, the coils are activated while other coils remain inactive. The activated coils generate flux, some of which will couple into the secondary magnetic unit.

It is an objective of the present invention to provide a means for efficiently transmitting power through resonance across extended distances. It is a further objective to provide an apparatus having this capability that is safe to use and does not produce excessive heat. It is a still further objective of the invention to provide such an apparatus that can be easily and consistently manufactured at a low price. Finally, it is an objective of the present invention to provide a power transmission apparatus that is easily tunable to various frequencies, that is durable and simple to use.

While some of the objectives of the present invention are disclosed in the prior art, none of the inventions found include all of the requirements identified.

SUMMARY OF THE INVENTION

The present invention addresses all of the deficiencies of prior wireless power source inventions and satisfies all of the objectives described above.

(1) A wireless power transmission system providing the desired features may be constructed from the following components. A transmitting unit is provided. The transmitting unit includes an inductive coil. The inductive coil serves as a transmitting antenna. A circuit is provided. The circuit includes a field-effect transistor, a signal generator, and a capacitor with a resistor in parallel connection with the capacitor. A receiving unit is provided. The receiving unit has at least one loop stick antenna located at a distance from a center of the coil of up to twice a diameter of the coil. The circuit is tunable between 6 khz and 10 khz.

(2) In a variant of the invention, the field-effect transistor is an N channel Metal-Oxide-Semiconductor Field-effect Transistor (MOSFET).

(3) In another variant, the signal generator is a square wave generator.

(4) In still another variant, the capacitor is a 1.5 microFarad Mylar® film capacitor.

(5) In yet another variant, the resistor ranges in value from 2-4 ohms.

(6) In a further variant, the inductive coil is closely coupled. That is, there is little or no spacing between the wires in the coil. This close coupling has been found to substantially increase the voltage and current that can be transmitted at a given distance.

(7) In still a further variant, the inductive coil has 20-40 turns.

(8) In yet a further variant, 8. The wireless power transmission system, as described in claim 1, wherein optimal tuning for the circuit is 8 khz.

(9) In another variant of the invention, the at least one loop stick antenna has an iron core.

(10) In still another variant, the at least one loop stick antenna has a ferrite core.

(11) In a final variant, the iron core is approximately 1 in.×0.5 in.×3 in.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1, 2 and 8-9 illustrate a wireless power transmission system 10 providing the desired features that may be constructed from the following components. A transmitting unit 14 is provided. The transmitting unit 14 includes an inductive coil 18. The inductive coil 18 serves as a transmitting antenna 22. A circuit 26 is provided. The circuit 26 includes a field-effect transistor 30, a signal generator 34, and a capacitor 38 with a resistor 42 in parallel connection with the capacitor 38. A receiving unit 46 is provided. The receiving unit 46 has at least one loop stick antenna 50 located at a distance 54 from a center 58 of the coil 18 of up to twice a diameter 62 of the coil 18. The circuit 26 is tunable between 6 khz and 10 khz.

(2) In a variant of the invention, the field-effect transistor 30 is an N channel Metal-Oxide-Semiconductor Field-effect Transistor (MOSFET).

(3) In another variant, the signal generator 34 is a square wave generator.

(4) In still another variant, the capacitor 38 is a 1.5 microFarad Mylar® film capacitor.

(5) In yet another variant, the resistor 42 ranges in value from 2-4 ohms.

Figure 7:
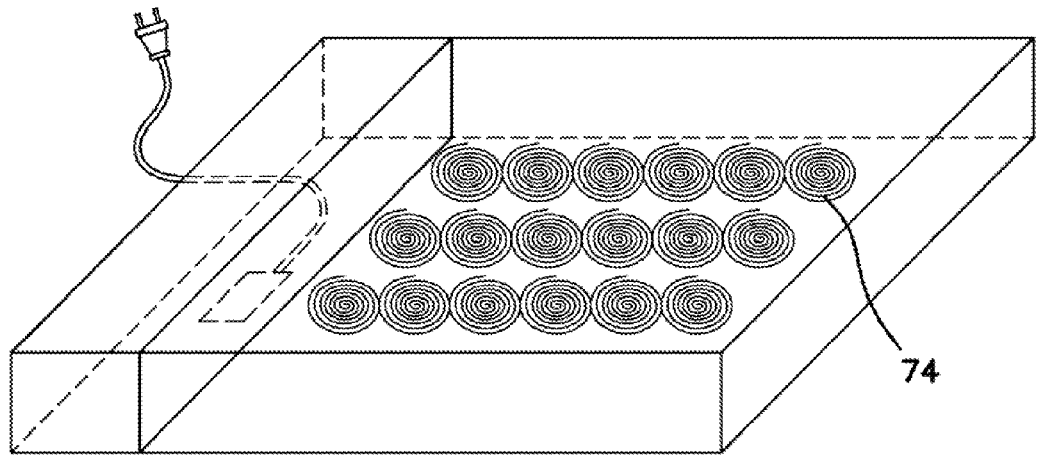
FIG. 7 is a perspective view of the transmission portion of the prior art Telefus invention.
Figure 9B:
FIG. 9B is a cross-sectional view of the transmission coil (loosely coupled) of the prior art Telefus invention.
Figure 9B:
Figure 9A:
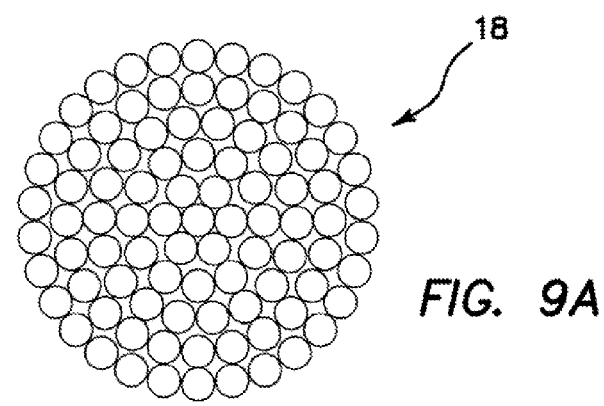
FIG. 9A is a cross-sectional view of the transmission coil (closely coupled) of the present invention taken along the line 9-9.

(6) In a further variant, the inductive coil 18 is closely coupled. That is, there is little or no spacing between the wires in the coil 18. This close coupling has been found to substantially increase the voltage and current that can be transmitted at a given distance. See FIGS. 9A and 9B illustrating close and loose coupling. FIG. 7 illustrates prior art use of loosely coupled coils 74 for power transmission, as in the Telefus design.

Figure 1:
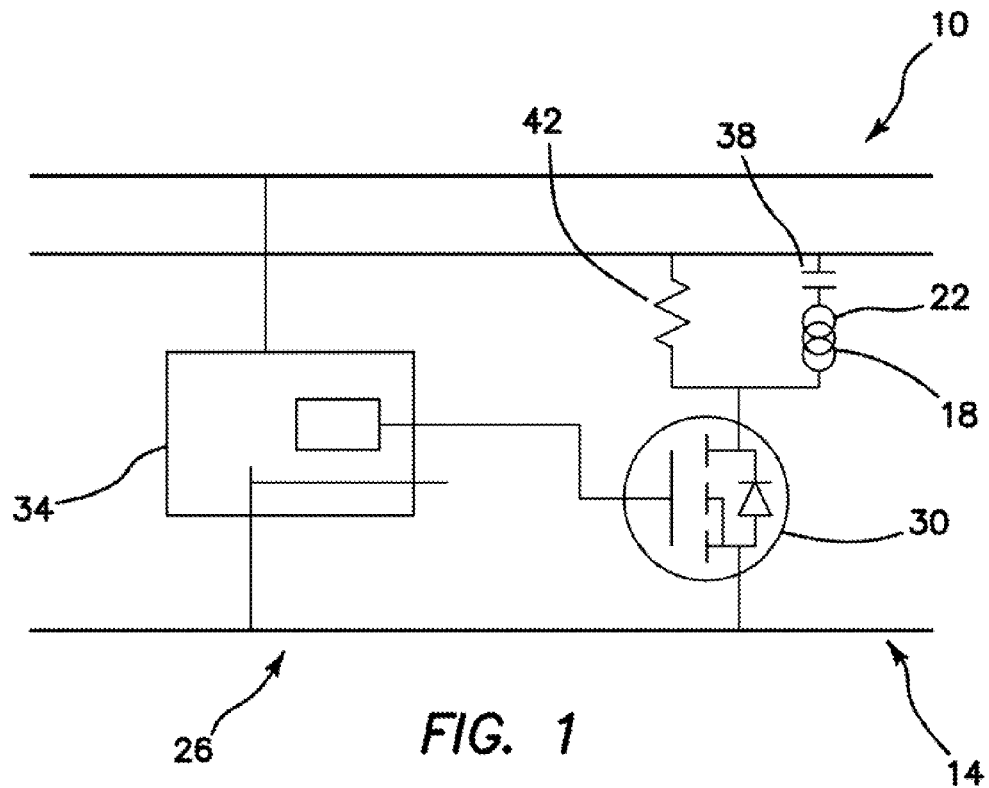
FIG. 1 is a schematic illustration of the transmitting portion of the present invention.
Figure 2:
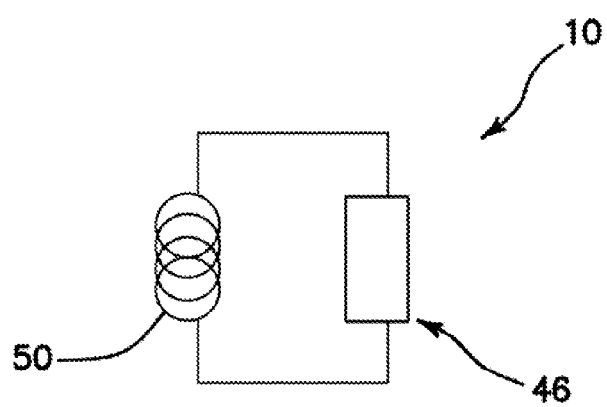
FIG. 2 is a schematic illustration of the receiving portion of the present invention.

(7) In still a further variant, as illustrated in FIG. 1, the inductive coil 18 has 20-40 turns.

(8) In yet a further variant, optimal tuning for the circuit 26 is 8 khz.

Figure 8:
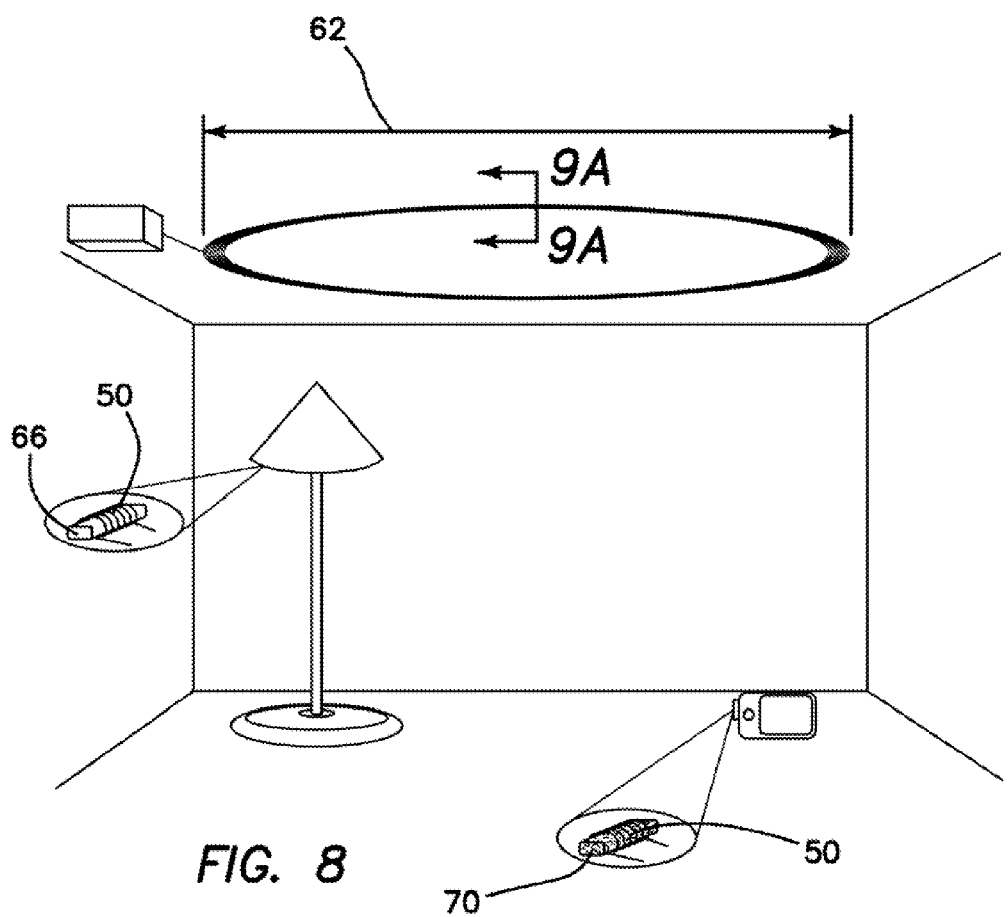
FIG. 8 is a perspective view of the transmission portion and receiving portions of the present invention.

(9) In another variant of the invention, as illustrated in FIG. 8, the at least one loop stick antenna 50 has an iron core 66.

(10) In still another variant, the at least one loop stick antenna 50 has a ferrite core 70.

(11) In a final variant, the iron core 66 is approximately 1 M.×0.5 in.×3 in.

Figure 3:
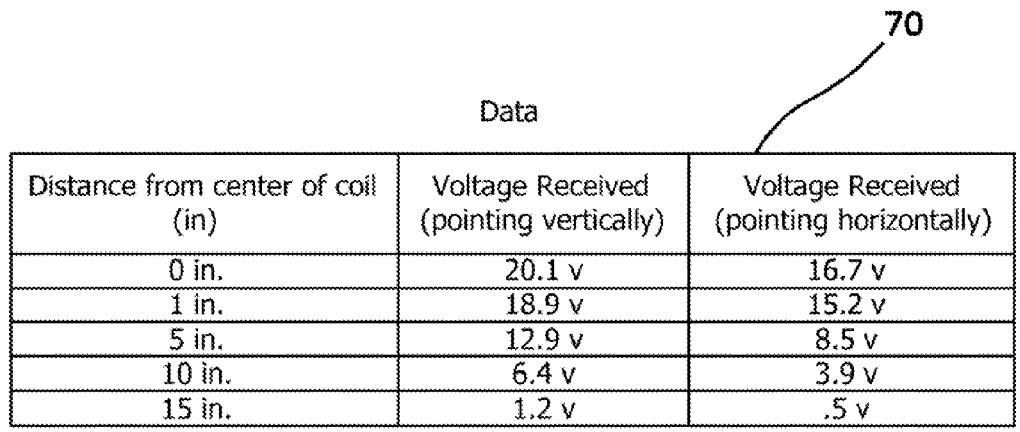
FIG. 3 is a tabular and graphical illustration of the voltage transmission capabilities of the FIG. 1 embodiment.
Figure 3:
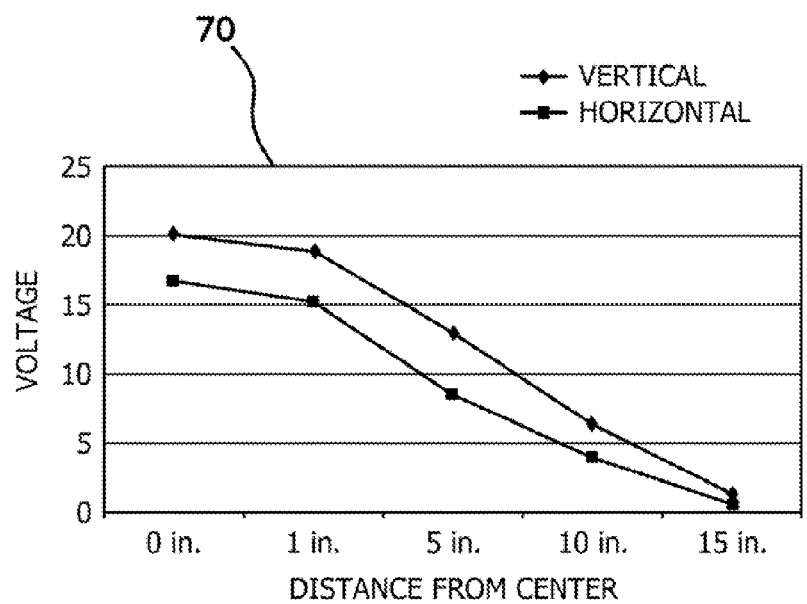
Figure 4:
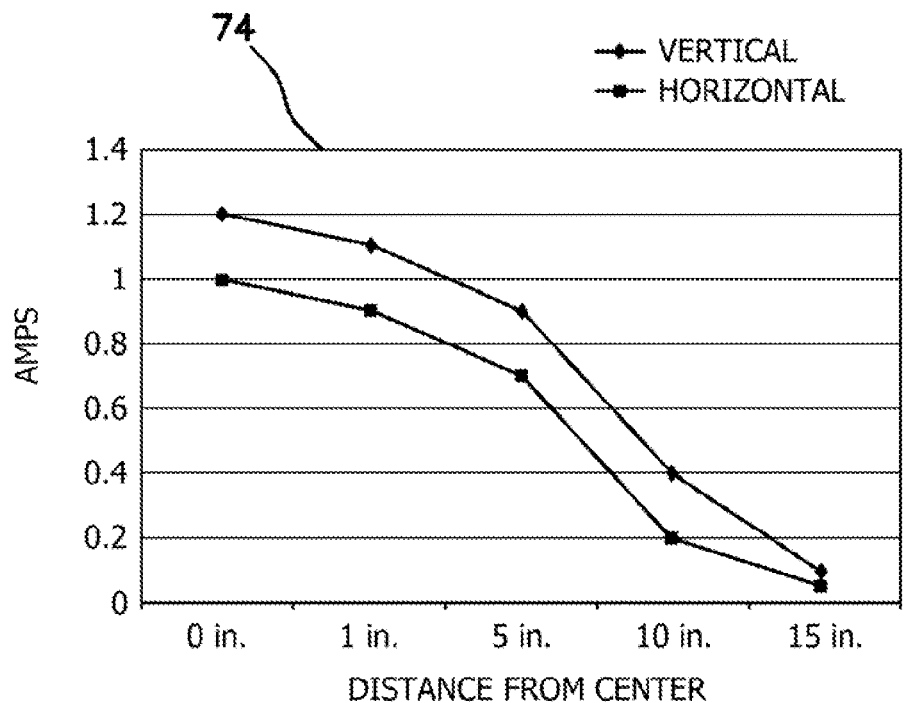
FIG. 4 is a tabular and graphical illustration of the current transmission capabilities of the FIG. 1 embodiment.
Figure 5:
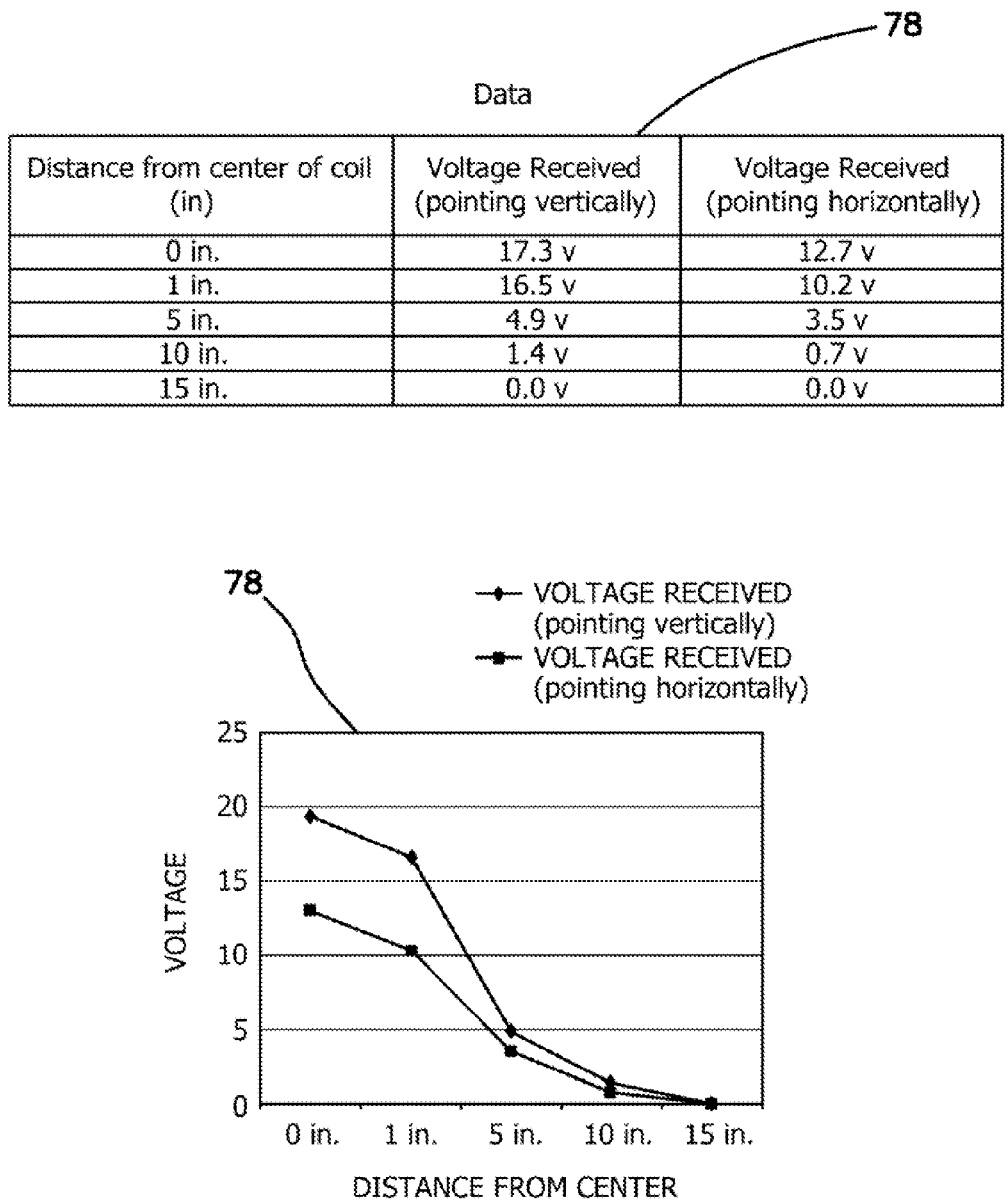
FIG. 5 is a tabular and graphical illustration of the voltage transmission capabilities of the prior art Telefus invention.
Figure 6:
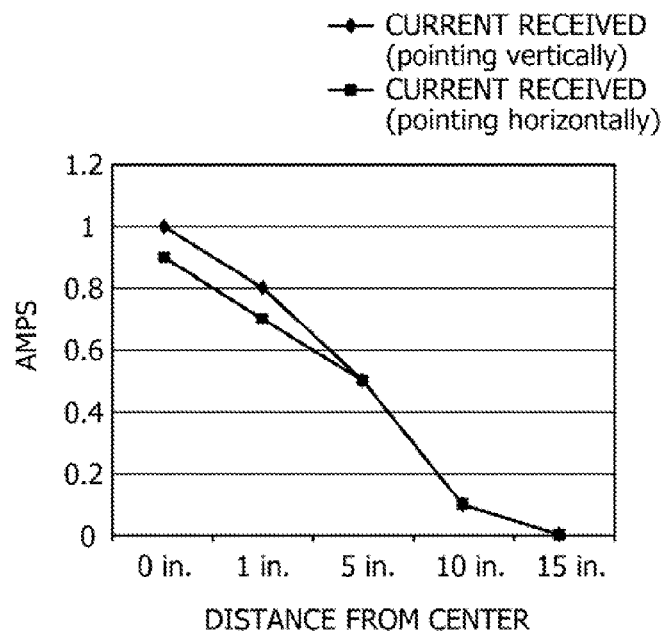
FIG. 6 is a tabular and graphical illustration of the current transmission capabilities of the prior art Telefus invention.

The present invention has a number of elements in common with U.S. Pat. No. 7,826,873, issued to Telefus. However, the design features of the present invention provide significant improvements over a contactless energy transmission converter built according to the specifications of Telefus. The tables and graphs shown in FIGS. 3 and 4 illustrate the voltage 70 and current 74 transmitted, both vertically and horizontally, at various distances by the present invention 10. The tables and graphs shown in FIGS. 5 and 6 illustrate the voltage 78 and current 82 transmitted, both vertically and horizontally, at various distances by a system of the Telefus design. As is clearly shown in these tables and graphs, the present invention is capable of transmitting higher voltage 70, 78 and increased current 74, 82 at every distance tested from the transmitting coil. As such, the present invention represents a significant improvement in the art of wireless power transmission.

The wireless power transmission system 10 has been described with reference to particular embodiments. Other modifications and enhancements can be made without departing from the spirit and scope of the claims that follow.

The invention claimed is:

1. A wireless power transmission system comprising:
   a transmitting unit, said transmitting unit comprising:
   an inductive coil, said inductive coil serving as a transmitting antenna;
   a circuit comprising a field-effect transistor, a signal generator, and a
   capacitor with a resistor in parallel connection with the capacitor, said
   circuit being tunable between 6 khz and 10 khz; and
   a receiving unit, said receiving unit having at least one loop stick antenna disposed at a distance from a center of said coil of up to twice a diameter of said coil.

2. The wireless power transmission system, as described in claim 1, wherein said field-effect transistor is an N channel Metal-Oxide-Semiconductor Field-effect Transistor.

3. The wireless power transmission system, as described in claim 1, wherein said signal generator is a square wave generator.

4. The wireless power transmission system, as described in claim 1, wherein said capacitor is a 1.5 microFarad Mylar film capacitor.

5. The wireless power transmission system, as described in claim 1, wherein said resistor ranges in value from 2-4 ohms.

6. The wireless power transmission system, as described in claim 1, wherein said inductive coil is closely coupled.

7. The wireless power transmission system, as described in claim 1, wherein said inductive coil has 20-40 turns.

8. The wireless power transmission system, as described in claim 1, wherein optimal tuning for said circuit is 8 khz.

9. The wireless power transmission system, as described in claim 1, wherein said at least one loop stick antenna has an iron core.

10. The wireless power transmission system, as described in claim 1, wherein said at least one loop stick antenna has a ferrite core.

11. The wireless power transmission system, as described in claim 9, wherein said iron core is approximately 1 in.×0.5 in.×3 in.

* * * * *